UNITED STATES PATENT OFFICE.

WILHELM SCHUMACHER, OF OBERDOLLENDORF, GERMANY, ASSIGNOR TO ERNST THALMANN, OF NEW YORK, N. Y.

PROCESS OF AGGLOMERATING PULVERULENT IRON ORES.

No. 862,666.

Specification of Letters Patent.

Patented Aug. 6, 1907.

Application filed September 16, 1904. Serial No. 224,717.

*To all whom it may concern:*

Be it known that I, WILHELM SCHUMACHER, a chemist, and a subject of the King of Prussia, residing at Oberdollendorf, in the Kingdom of Prussia, German Empire, have invented a certain new and useful Process for Agglomerating Pulverulent Iron Ores, of which the following is a specification.

The finely pulverized iron ores such for instance as are obtained by the magnetic separating process, also dust from blast furnaces, pyrites, detritus, and the like, present difficulties in the smelting processes because on the one hand they are liable to be carried away as dust with the blast furnace gases, and on the other hand they fill out or clog the interstices in the charges of ore necessary for the passage of the gases. It has therefore for some time past been endeavored to discover means for converting these pulverulent ores into an agglomerated form, such as into briquets; such endeavors have however hitherto been without practical results. The proposed methods were either too expensive or the briquets were liable to deterioration in the atmosphere, or they crumbled away at a comparatively low temperature in the blast furnace, or too great a proportion of the binding material was used for obtaining the necessary cohesion of the briquet, and the ore was rendered too impure thereby. The said disadvantages are obviated by the use, as the binding medium for the pulverulent ores, of colloidal calcium silicate, which withstands in a high degree the action of the atmosphere, and is more than sufficiently heat resisting.

In consequence of the considerable binding power of colloidal calcium silicate, only a small addition thereof is required for effectually agglomerating the ore; and consequently any rendering impure of the ore thereby, if the admixture of silica can be considered as such, is very slight.

Colloidal calcium silicate has been employed in the manufacture of artificial stone, in particular of lime sandstone; the chemical process on which this manufacture is based also indicates the method in which the calcium silicate can be obtained in the most suitable and least expensive manner for use as binding material for the agglomeration of the ore into briquets. It has also already been attempted to employ calcium silicate produced by the action of steam pressure upon hydrate of lime and sand for the agglomerating of iron ores, but no practical result has been obtained thereby, and this was not to be expected when it is considered that on the one hand only a small quantity of silicate of lime is obtained by the imple reaction of lime and sand, and on the other hand that in the finished briquet with the insufficiently finely divided condition of silica in the form of sand, this is partly separated from the lime by the greater mass of the ore, and consequently is not capable of reacting therewith.

Instead of ordinary sand or other silicious material in the natural state as used heretofore, I employ, according to my present invention, sand, quartz, flint, or other efficient form of silica or silicic acid, ground to an impalpable powder (so as to be of a fineness similar to that of Portland cement). While it is well known that solid bodies react with each other, or with liquid bodies, the better the more finely they are divided, I have discovered that by employing finely ground, or, in other words, decrystallized silicious material, I secure far better results than could be expected from the well known phenomenon above referred to. As a matter of fact, I have found that sand ground to a certain fineness or mesh, according to my invention, will yield much more efficient results than sand which has the same degree of fineness by nature. The reason for this difference of behavior is that the particles of sand and other silicious material as they occur in nature, are of an approximately globular structure so as to have a minimum of exposed surface for a given volume or fineness; by the grinding operation, however, such particles are broken up into flakes, needles and other pieces of irregular shape, each of which presents a much greater surface for a given volume than a particle of the same fineness in the natural (approximately globular) state. Now, the thoroughness of a reaction depends not only on the size of the particles, but to a much higher degree upon their shape, or, as it may be put, upon the relation of surface to volume.

By the use of very finely ground silicious material, the result is obtained on the one hand that the silicic acid, as also the hydrate of lime, are distributed in the most perfect manner throughout the entire briquet, and that, on the other hand, under the action of steam pressure the mixture is converted to a very great extent into silicate of lime.

All substances containing a large percentage of silica or silicic acid are applicable, and the purer they are, the more perfect will be the binding action. This is particularly the case as regards the purity of the lime. A small percentage of alumina in the quartz or the lime appreciably diminishes the binding power; the unusually high degree of binding power of pure colloidal calcium silicate with iron ore, (which binding power, for instance, greatly exceeds that of Portland cement relatively to sand) may possibly be explained by the assumption that when in contact with iron oxids in the hardening chamber such calcium silicate forms a body similar in character to Portland cement, but differing from it by the substitution of iron oxid for alumina.

The improved process is carried out as follows. Very finely ground quartz or flint (the finer and purer the better) is mixed with pure finely ground oxid of lime or hydrate of lime, preferably in equal parts. The proportions can, of course, be varied, but as limestone has almost always to be added to the charges of the blast furnace, the percentage of lime in the mixture should always be abundant. With this compound is then mixed, together with the addition of the necessary amount of moisture, the dust or powder to be agglomerated, an admixture of about 5 per cent of the quartz-lime compound being generally sufficient. The percentage of the addition is of course dependent upon the chemical and physical nature of the ore powder. The briquets formed of the said compound are hardened by subjecting them to the action of steam under pressure in a closed vessel.

In some cases, for example when the ore to be agglomerated is very finely subdivided, it may be advisable to convert the quartz-lime mixture partially into colloidal calcium silicate before the admixture to the ore. This is effected by placing the quartz-lime compound in a lime slaking drum and treating it with steam under pressure.

What I claim and desire to secure by Letters Patent of the United States is:—

The process of producing ore briquets from pulverulent ores, blast furnace dust and the like which consists in mixing the same, irrespective of its silica content, with silica ground to an impalpable powder and lime, with the addition of water, forming the mixture into briquets, and subjecting the briquets to the action of steam, under pressure, substantially as described.

In witness whereof, I have hereunto signed my name in the presence of two subscribing witnesses.

WILHELM SCHUMACHER.

Witnesses:
WOLDEMAR HAUPT,
WILLIAM MAYNER.